Oct. 4, 1955 F. K. H. NALLINGER 2,719,436
SHIFTING MECHANISM FOR TRANSMISSIONS, ESPECIALLY IN MOTOR VEHICLES
Filed March 10, 1950
Fig. 1.
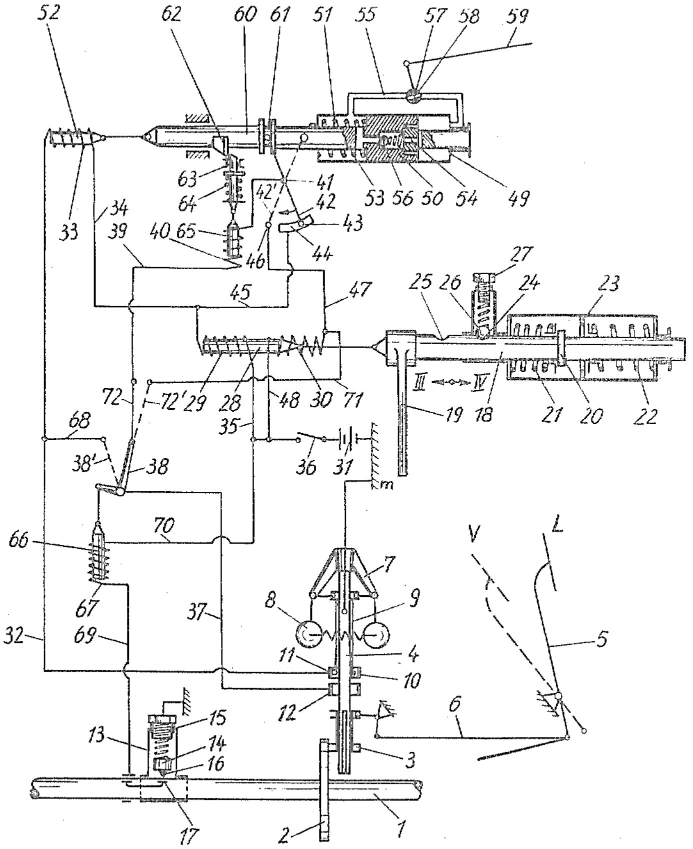
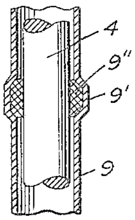
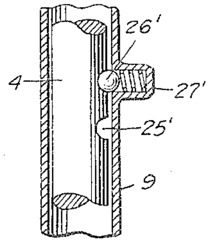
Fig. 3.
Fig. 2.
INVENTOR
FRIEDRICH K. H. NALLINGER
By:
Haseltine, Lake & Co.
AGENTS United States Patent Office 2,719,436

Patented Oct. 4, 1955

2,719,436

SHIFTING MECHANISM FOR TRANSMISSIONS, ESPECIALLY IN MOTOR VEHICLES

Friedrich K. H. Nallinger, Stuttgart, Germany, assignor to Daimler-Benz Aktiengesellschaft, Stuttgart-Untertürkheim, Germany Application March 10, 1950, Serial No. 148,856

Claims priority, application Germany March 11, 1949

26 Claims. (Cl. 74—472)

The invention relates to an automatic or semi-automatic shifting mechanism for transmissions, especially in motor vehicles and more particularly to the provision of improved means for shifting such transmissions, especially a suitable adaption of the gear shifting to the varying driving conditions of a motor vehicle. The invention also seeks to avoid unnecessary upward and downward shifting in rapid succession The known automatic or semi-automatic, i. e. preselective transmissions have the principal disadvantage that they cannot accommodate themselves sufficiently to the individual circumstances of the operating conditions. This is escepially true for the working of motor-vehicles which is frequently subject to constantly changing conditions, above all in large towns or in the mountains. The automatic shifting of the gear depending only upon the R. P. M. or the driving speed or on the R. P. M. and the torque, will result under existing circumstances, in a constant change of the shifting or preselecting which might be unsuitable, unnecessary or even dangerous to the traffic.

Thus it may be desirable, for instance in a mountainous region, that the car, when driving uphill on a winding pass-road, even if producing a surplus efficiency, does not shift to the following gear (e. g. the overdrive) corresponding to the influences (speed, torque) exerted at that moment. If, for instance, the preselective shifting is dependent upon speed and torque, the following may happen: On a relatively practicable straight stretch of the road the driver increases the speed of the car and releases the gas pedal, when a sharp and dangerous curve comes in sight. If now the gear shifting dependent upon speed and torque has been pre-selected, the next highest speed, for example the overdrive, would be shifted in at the moment when the gas is released, as the speed of the vehicle is still relatively high at that moment and the driver calls for a low torque corresponding to the release of the gas. Such a shifting, however, is highly undesired, as already in the next moment the brake has to be applied before the curve, in order to go into the curve slowly, and a short time afterwards a high torque is called for by giving full throttle in order to speed up the car. The car would therefore, pass the curve at a high speed (f. i. overdrive), instead of at a low speed as desired, and it would shift back to the low speed after having passed the curve. Thus a constant unnecessary shifting up and down is caused, which, besides other disadvantages, renders the driver uneasy, especially if he has to pass a sharp curve with a steep slope at one side at high speed.

Similar disadvantages arise with the above automatic gear for instance in town-traffic, where free and quickly passable tracts vary with suddenly occurring obstacles or curves which require slowing down of the car before passing another vehicle.

Another typical example of the inadequacy of the immediately corresponding automatic action of the gear is the following: If for instance in metropolitan traffic the car has to pass another vehicle with increasing speed in order to pass it before the approach of a third vehicle coming from the opposite direction (f. i. a streetcar bound to the rails), an inconvenient and dangerous situation could arise due to the automatic action of the gear, if—corresponding to the increasing speed—the next gear is shifting in just at the moment of passing and thus, without the driver being prepared for this, the acceleration of the car decreases just at the critical moment. The result might be that the car cannot overtake the vehicle driving in the same direction and that thus the car is squeezed in by the opposing vehicle.

The invention aims at removing or at least decreasing those disadvantages and consists mainly in the fact that the shifting, from the inception of the shifting conditions takes place with a retardation. Such a retardation is important especially for the shifting from the second high (f. i. the direct) speed to the highest speed (f. i. the overdrive), but can be provided also for the up-shifting of other speeds, or for every up-shifting from a low to a higher speed. The retardation can be of different length, according to the size of the vehicle, the value of acceleration etc. and suitably extend over a period ranging from 2 to 20 seconds. Such a retardation will generally be sufficient to avoid a frequent and unnecessary shifting-up and closely following shifting-down.

By applying such a retarded shifting, driving uphill on a winding pass-road for instance would be as follows: The driver is driving on a relatively straight and distinctly visible stretch of the road with ½, ¾ or full throttle. Before reaching the sharp curve he releases the gas partially or wholly. By doing this the driver would order shifting over to the next gear, say to the overdrive, since the speed of the car is relatively high. A time retardation, adjusted between 2 and 20 seconds, according to the characteristic of the car, is sufficient, however, to retard the shifting to the next highest gear, or to the overdrive, until the speed of the car is reduced so much that the automatic transmission would have shifted down to the low speed in any event. Thus the car stays at the low speed desired by the driver and can consequently be accelerated either while in the curve or immediately after having left it by a new call for torque, that is by giving gas, without another previous gear shifting being necessary. As for reasons of security the shifting-down to a lower speed has always to take place at once, if possible, the retardation is suitably provided only for the up-shifting, while the shifting-down takes places immediately at the inception of the shifting conditions. Furthermore the gear is preferably arranged in such a way that by pressing down the accelerator beyond the full load position, at least the normal full load position, in any case, independent of the driving speed, the low speed is shifted in, especially from the overdrive to the next low (i. e. the direct) gear.

According to the invention a further improvement of the gear shifting is achieved by the fact that in the case of a shifting, or of a pre-selecting, dependent upon the torque, or on the torque requirement, the shifting or preselecting is done with a sliding scale, that is at higher R. P. M. or driving speeds only, when the car is driving at a higher torque, when a higher torque is required of the car by the driver. Such a way of shifting would correspond most suitably to the demands made on the operation of the vehicle, because generally the driver, when opening throttle, wants to bring the car to higher speeds and therefore wants an increased torque to accelerate the car even at higher speeds.

The dependence on the torque, or on the required torque, can for instance be provided in such a way that the overdrive shifts in at low torque demands (f. i. idling or partial load position of the accelerator), approximately at a driving speed of 45 or 50 km./h., at full torque demand (full load position) on the other hand at a speed of 70–80 km./h. only. At a mean torque demand the shifting would take place at a corresponding driving speed.

The shifting-down can take place in a similar way with a sliding scale, the shifting-down being effectuated for instance under full load at a speed of about 70—80 km./h. (in some cases with a certain hysteresis, that means at a somewhat lower driving-speed), while when a small torque is required, the shifting-back takes place at a correspondingly decreasing driving-speed, for instance down to 45–50 km./h., at the smallest torque demand. In any case, however, a definite speed minimum must be given, below which the next lower speed (f. i. the direct speed) is shifted in, so that in such a case even a relatively inexperienced driver does not suddenly find himself in the situation of driving at overdrive below this minimum speed, in town-traffic or in intersecting streets, thus being obliged to drive a car with "stiff" driving characteristics.

Instead of a back-shifting with a sliding scale, however, a back-shifting without such a scale can be provided too, where the back-shifting always takes place at a certain constant driving speed (f. i. 50 km./h.). This fixing of the back-shifting point at a certain minimum value would, with a view to the consumption, have the advantage that the driver could drive at the overdrive longer and more frequently even in a slightly mountainous area, that is, relatively economically. In order to effect a higher acceleration at any driving speed also in this case, the driver can, in some cases, as is suitably provided, shift the higher gear back to the next lower gear by pressing the accelerator beyond the full load position, at his will.

In the accompanying drawing: Figure 1 is a diagrammatic illustration of an example of the shifting mechanism according to the present invention including electrical operating means and Figures 2 and 3 are alternative forms of a detail thereof.

On the drive shaft 1, which for instance can be the drive shaft of the transmission of a motor vehicle, a friction disk 2 is fastened, with which a friction wheel 3 meshes. The friction wheel is non-rotatably mounted on a shaft 4, but axially movable, where the moving takes place depending upon the position of the accelerator 5 (resp. of a corresponding accelerating or controlling member for the engine) by means of a rod 6. In the idling position L of the accelerator the friction wheel 3 is in an upper position and thus is driven by the friction disk 2 at a high gear ratio, while in its full load position V, corresponding to its lower position, it runs on an inner diameter of the friction disk 2 and has therefore a relatively lower speed. In some cases—suitably by an intermediate spring pressure point—a further operation possibility of the accelerator 5 beyond the full load position V can be provided which could effect, for instance a further relative retardation of the shaft 4.

Furthermore a centrifugal governor 7 of any kind, for instance with the centrifugal weights 8, is fastened on the shaft 4. At the deflection of its centrifugal weights, a sleeve 9 is adjusted with a contact 10 by the governor which either (below a certain speed) touches a contact 11 or (above that speed) a contact 12.

Furthermore a centrifugal device 13 of any kind is arranged on the drive shaft, which in the design is schematically indicated by a centrifugal weight 14, the spring pressure of which can be regulated by a screw 15—in some cases also from the driver's seat. The centrifugal weight 14 electrically connected with the earth bears a contact 16 which touches a contact 17, for instance on shaft 1, as soon as the speed of the shaft 1, respectively the driving speed of the car slows down below a certain minimum limit (f. i. 45–50 km./h.).

For the shifting of two gears, for instance a direct gear (III) and an overdrive (IV) a shifting rod 18 is furthermore provided which, by means of a shifting fork 19, shifts these gears directly or indirectly, for instance by pre-selecting the gear. The shifting rod is for example provided with a collar 20 which, when moving the shifting rod to the left, loads the spring 21, when moving the shifting rod to the right, loads the spring 22. In the mean position of the shifting rod any of the two springs 21 and 22—suitably under a certain previous tension—lies against a mean ring stop 23 of the spring case. Furthermore the shifting rod is provided with two notches 24 and 25, in which a ball detent 26 under spring pressure which can be regulated by a screw 27, is engaged at the shifting in of the third or the fourth gear. In some cases a mean neutral position is determined by the ring stop 23.

The shifting rod 18 is coupled with a solenoid core 28 which adjusts the shifting rod 18 at the excitation of the coil 29 (as indicated) to the left, that is, shifts to the direct speed (III), while an excitation of the coil 30 induces a movement of the shifting rod 18 to the right and by this the shifting to the overspeed (IV).

The current is furnished by an electric source 31 which for instance is connected with the governor sleeve 9 through the earth *m* of the car. From here, as already indicated, the current is led through the contact 10 either to the contact 11 or to the contact 12. From the contact 11 the electric circuit leads through a conductor 32, a solenoid coil 33 and a conductor 34 to the solenoid coil 29 and from there through a conductor 35 and a switch 36, operable by the driver at will, back to the source of electric current 31.

By the cooperating of the contacts 10 and 12 on the other hand, an electric circuit is closed which through a conductor 37, a switch 38 and a conductor 39 leads to a solenoid coil 40 and from there to the centre point 41 of a switch 42. In the design the axis of rotation 41 of the switch 42 is through the switch lever and the sliding contact 43 in a leading connection with the contact plate 44, from which the current is led further through a conductor 45 to the solenoid coil 29. If, on the other hand, the switch 42 is switched to the position 42' in the direction of the arrow, the contact 43 gets into touch with a contact 46, from which a conductor 47 leads to the solenoid coil 30, which again through a conductor 48 is connected with the switch 36 respectively the electric source 31.

For the operating of the switch 42 a time retarding device is provided which can be formed in any way. For instance an oil cataract, an air brake, a hydrodynamic brake, a flymass brake, a chronometer of any kind or the like can be used as such. The design shows as an example an oil cataract consisting of a cylinder 49, in which a piston 50 is shifted to the right by the pressure of a spring 51 and to the left by the effect of the solenoid core 52. The two sides of the piston 50 are connected with each other by bores 53, 54 in the piston 50 on the one hand, and by a detour 55 on the other hand. Between the bores 53 and 54 a back pressure valve 56 is arranged which opens when the piston 50 is shifted to the left and by this resists only slightly to this shifting; at a shifting of the piston to the right on the other hand, the bore 53 is locked by the valve 56, so that the fluid in the cylinder 49 (f. i. oil) can get to the left side of the piston only through the by-pass 55. The detour 55 is here formed as a throttle line, either by a correspondingly narrow width or by a special throttle point 57 which, in some cases, can be formed in an adjustable way, respectively be arranged in a movable member 58. The adjusting can, in some cases, be effected from the driver's seat through the rods 59.

The shaft 60 of the piston 50 has a shifting groove 61 in which the lever 42 is engaged, which is swung from the one to the other end position according to the position of the piston 50. Furthermore a nose 62 is arranged at the piston shaft 60, behind which a latch 63, beveled on one side, is engaged, which is pressed upward by a spring 64 and can be pulled downward by the solenoid core 65 when the coil 40 is excited.

Furthermore the shifting lever 38 is connected with a solenoid core 66 which, when electric current flows through the coil 67, shifts the lever 38 to the shifting position 38′ and by this connects the conductor 37 with a branch conductor 68 of the conductor 32. The solenoid coil 67 is thus connected by the conductor 69 with the contact 17 on the one hand and by the conductor 70 with the switch respectively the electric source 31 on the other hand. Furthermore a conductor 71 can be provided which avoids the retarding device and which for instance by a switch 72, operated by hand or the like, can be switched into the current circuit instead of the circuit section 39 to 47.

The upward shifting of the transmission is effected in the following way:

It is assumed that the whole equipment is in the shown position, that is the shaft runs at a mean speed, while the accelerator 5 is idling in the position L respectively is in a low partial load position. The friction wheel 3 is, according to its upper position, driven at a relatively high gear, but according to the speed of the shaft 1 also at a mean speed. Here the governor weights 8 are still in such a position, that the contact 10 is connected with the contact 11. Therefore the current (provided that the switch 36 is closed) is led through the conductor 32 to the solenoid coil 33 and from there through the conductor 34 to the coil 29. Therefore the piston 50 will under the pulling effect of the solenoid core 52 take its left end position under the tension of the spring 51, where the latch 63 keeps the piston in this end position. By the flowing of electric current through the coil 29 furthermore the solenoid core 28 and thus the shifting rod 18 is moved to the left, which corresponds to a shifting in of the direct or third speed, where the spring 21 is strained by the collar 20, while the spring 22 is supported against the ring-stop 23. The ball 26 is engaged in the notch 24 of the shifting rod.

If now the speed of the shaft 1 is increased (f. i. to a speed corresponding to a driving speed of 45–50 km./h.) and thus at an uncharged position of the accelerator 5 the speed of the shaft 4, the centrifugal weights 8 give a further deflection to the outside, by which the contact 10 is separated from the contact 11 and brought into touch with the contact 12. The current now flows from the contact 12 through the conductor 37, the shifting lever 38 and the conductor 39 to the solenoid coil 40 and from there through 41, 42, 43, 44, 45 to the solenoid coil 29. As thus the coil 29 is still under current, no shifting of the shifting rod 18 is effected as yet. By leading the current through the coil 40, however, the solenoid core 65 is attracted and by this the latch 63 is released from its engagement with the nose 62. As now no more current flows through the coil 33, the spring 51 can start to influence the piston 50 and try to shift this from its left end position to the right. By this, however, the valve 56 is shut, so that the fluid at the right side of the piston can be displaced to the left side of the piston only through the throttle point 57. The displacement will therefore, according to the position of the throttle valve 58 take place more or less quickly. For instance, a throttle can be provided at such a point that the displacement of the fluid from the right to the left can require a period of 2 to 20 seconds. By the shifting of the piston 50 the switch 42 is moved to 42′, where it leaves the contact plate 44 just before reaching its end position and gets into touch with the contact 46. The current led through the conductor 39 and the coil 40 to the turning axis 41 of the switch is now therefore led back through the conductor 47 to the coil 30 and from there through the conductor 48 to the switch 36 respectively to the electric source 31. Thus by the shifting the current is taken off from the coil 29 and led to the coil 30. The solenoid core 28 is shifted to the right, which corresponds to a shifting of the shifting rod 18 to the right up to its right end position. The spring 21 is by this released until it touches the mean position of the shifting rod, while the spring 22 is now loaded beyond this mean position. In this end position the ball 26 is engaged into the notch 25. By this the overdrive is shifted in.

At a premature interruption of the action of the upward-shifting, the mechanism operates in the following way:

We assume that by leading current through the coil 40 the piston 50 is moved and thus the order for the shifting to the overdrive has been given. The piston 50, however, has not yet reached its end position, and the contact 43 is therefore still in connection with the contact 44. In the meantime the car—for instance when passing a curve—has reduced its driving speed, the speed of the shaft 1 respectively the shaft 4 has decreased, so that the contact 10 is again connected with the contact 11. As this moment electric current is led again through the coil 33, while the current is taken off from the coil 40. The current is still flowing through the coil 29. The solenoid core 52 pulls the piston 50 to the left and the valve 56 is opened, so that the piston gets back to its left end position almost directly. By this the latch 63 is pressed back due to the beveling of the nose 62, so that after the passing of the nose it can lock the piston. Thus the original position is reached again. During the whole procedure the third speed was shifted in.

Up to now it has been assumed that the accelerator or other corresponding regulating member was maintained in an unchanged position. The shifting, however, is not only dependent upon the speed of the shaft 1, but also upon the position of the accelerator. If the accelerator 5 is in the position L (idling position or low partial load), the friction wheel 3 is driven by the friction disk at a high gear; the shaft 4 will correspondingly rotate at a high speed, even at a relatively low speed of the shaft 1, that is, at a low driving speed, and therefore the governor 7 will shift from the contact 11 to the contact 12 even at low driving speeds. For example, this shifting takes place in the position L of the accelerator, at a driving speed of 45 to 50 km./h., and by this the order for the shifting from the third (direct) speed to the fourth speed (overdrive) is given. If now the accelerator is pressed down, the friction wheel 3 is shifted down, the transmission between 2 and 3 gets lower and the shaft 1 must assume a higher speed, in order to make the governor work. The more therefore the accelerator is pressed down the higher is that driving speed of the car at which the shifting from the third to the fourth speed takes place or at which the order for this is given. In the full load position V of the pedal this driving speed is for instance assumed to be 70 to 80 km./h.

This automatic shifting with "a sliding scale" has furthermore the effect that a constant driving speed or speed of the shaft 1 a back-shifting of the gears is induced, the higher gear shifted in and the accelerator shifted over from the position L to the position V or to an intermediary position corresponding to the actual driving speed.

The shifting-down is effected in the following way:

The overdrive (fourth speed) is assumed to be working. The accelerator 5 is in a partial load position between L and V, or in full load position V. The shaft 1 is running at a speed which corresponds to a driving speed above about 45–50 km./h. The centrifugal weights 8 have deflected, the contacts 10 and 12 are in touch with each other. The current is flowing through the coil 40, the contact 46 and the coil 30. The piston 50 is in the right end position and the shifting rod 18 as well.

If now the speed of the shaft 1 is reduced, the governor 7 will, at a certain moment, separate the contacts 10 and 12 again and, at the same time, connect the contacts 10 and 11. If the governor would work without friction or without hysteresis and the position of the accelerator be constant, this would occur at the same driving speed at which the shifting up from the third to the fourth speed takes place, for instance at a speed of 70–80 km./h. for full load position V. By the effect of the friction working opposite to the shifting of the governor the shifting-back will take place, however, only at a lower driving speed (that is, with a hysteresis effect) than the shifting-up. Such a retarded back-shifting is desired in order to avoid a constant up and down shifting of the gears when driving at a speed approaching the speed limits decisive for the shifting-up. In order to increase the effect of the hysteresis, an intentional friction or the like can be provided for instance in the governor or in the parts to be adjusted by the governor. For example, the sleeve 9 may be enlarged as at 9' in Figure 2 to accommodate a friction ring 9'' having a friction fit around the shaft 4, or the sleeve 9 can be provided with the notches of a notching device indicated at 25', 26', and 27' in Figure 3, which is engaged when the contact 10 is connected with the contact 12 and which effects a certain and if necessary adjustable resistance against a separation of these contacts. If the shifting-up was done at a speed of 70 to 80 km./h., the shifting-down can be effectuated (at a constant position of the accelerator, f. i. in position V) for example at a speed of 60 to 70 km./h. or even at lower driving speeds. By the shifting to the contact 11 electric current flows through the coils 33 and 29 and by this the piston 50 and the shifting rod 18 are moved to the left (III), which is done without retardation.

In order to be able to shift in the lower gear when the driving speed is so high that even at full load the lower gear does not shift in automatically, the accelerator can be pressed beyond the full load position V. The speed of the governor can by this be reduced so much that in any case the lower gear is shifted in. Instead of this also an immediate shifting to the lower gear can be effectuated by overpressing the accelerator, for instance by leading electric current through the coil 67 or by shifting the switch 38 to the position 38' or another switch.

On the rest the shifting-down as well as the shifting-up is done with a "sliding scale." The more the accelerator is pressed down the higher the speed limit will be at which the shifting from the higher to the lower gear (especially from the overdrive to the direct speed) is effectuated.

That now with a released accelerator or an accelerator adjusted for a small partial full load, the driving speed at which the shifting to the lower gear takes place is not too low (f. i. below 45 km./h.), as by this the car would be "stiff," an additional governor 13, 14 is provided which works independent of the position of the accelerator. The spring pressing the centrifugal weight 14 could be arranged for instance in such a way that at a speed of the shaft 1 corresponding to a driving speed of 45 km./h., the contact 16 just meets the contact 17 and thus closes an electric circuit through the coil 67. The solenoid core 66 is attracted and the switch shifted to the position 38'. This has the result that the current coming through the contact 12 is now led through the coils 33 and 29 instead of through the coils 40 and 30, and that thus the effect is the same as if at that moment the governor would have shifted the contact 10 from 12 to 11. According to this the lower speed is shifted in, independent of the position of the accelerator 5, in any case at a speed below the predetermined driving speed (f. i. 45 km./h.).

In order to be able to avoid the retardation of the shifting, for instance on high roads, a conductor 71 can be provided which avoids the retarding device which can be introduced into the current circuit, for instance by hand from the switchboard or in another suitable way by a switch 72. At the shifting of the switch 72 to the position 72' the current flows, as soon as the centrifugal governor has shifted to the contact 12, through the conductors 37 and 71 immediately to the coil 30, so that the circuit section for the operating of the retarding device (39 to 47) remains without current and the fourth speed, or the overdrive is shifted in (or pre-selected) immediately.

At the shifting to lower speeds it will be necessary, under existing circumstances, to put the shifting rod 18 into a mean neutral position. This is done for instance by opening the switch 36 or by interrupting the electric circuit in another way. By this the coils 29 and 30 remain without current and the shifting rod 18 can, under the pressure of the springs 21, 22 move to its mean neutral position, in which the collar 20 is within the ring stop 23.

Instead of providing a dependence of the shifting upon the accelerator, or upon a corresponding regulating member for the engine, the shifting can be effectuated also in dependence upon another magnitude changing as a function of the engine torque. Here the most suitable thing would be a torque indicator reacting immediately to the torque of the engine or to the torque of the drive shaft of the car, for instance a device arranged on the drive shaft of the motor vehicle which transmits the torque itself. Instead of this also the intake manifold pressure of the engine or the like can be used, for instance.

What I claim is:

1. In a driving mechanism for a vehicle having means for producing a variable control effect proportional to the speed of the vehicle, the combination comprising a transmission, a shifting mechanism for shifting said transmission, a regulating mechanism responsive to said variable control effect and controlling the operation of said shifting mechanism at least partially automatically dependent on reaching the shifting value of said variable control effect, and a retarding device operatively connected to said automatic regulating mechanism for preventing immediate operation of said shifting mechanism by said automatic regulating mechanism until a given time has elapsed after the shifting value of said variable control effect has been reached.

2. In a driving mechanism the combination according to claim 1, with means for rendering the retarding device inoperative and for making possible an immediate operation of the shifting mechanism.

3. In a driving mechanism for a motor vehicle a multi-speed transmission, a shifting mechanism for shifting said transmission, a speed-responsive regulating mechanism controlling the operation of said shifting mechanism at least partially automatically, said regulating mechanism being dependent upon a speed condition of the vehicle and shifting said shifting mechanism after a predetermined shifting speed is reached, and a retarding device operatively connected to said automatic regulating mechanism for preventing immediate operation of said shifting mechanism by said automatic regulating mechanism until a given time has elapsed after said shifting speed has been reached.

4. In a driving mechanism the combination according to claim 3, wherein said regulating device is operative to prevent immediate operation only upon shifting to a higher speed but is inoperative upon shifting to a lower speed.

5. In a driving mechanism the combination according to claim 3, wherein said retarding device is operative to prevent immediate operation of said shifting mechanism upon shifting to at least a higher speed.

6. In a driving mechanism the combination according to claim 3, wherein said retarding device is operative to prevent immediate operation of said shifting mechanism upon shifting to a part of the speeds of said transmission only.

7. In a driving mechanism the combination according to claim 6, further comprising a device responsive to a speed below a certain driving speed for shifting said transmission to a lower speed independently of the position of said performance regulating mechanism.

8. In a driving mechanism the combination according to claim 6, further comprising a device responsive to a speed below a certain driving speed, independent of the position of the performance regulation mechanism of the engine, for shifting to the second gear, if the highest gear had been engaged before.

9. In a driving mechanism the combination according to claim 6, further comprising a device responsive to a speed below a certain speed, independent of the position of the performance regulation mechanism of the engine, for shifting to a lower gear, and an adjusting device for the last-mentioned device, by which the driving speed at which the lower gear engages can be regulated.

10. In a driving mechanism for a vehicle having means for producing a variable control effect proportional to the speed of the vehicle, the combination comprising a transmission, a shifting mechanism for shifting said transmission, a regulating mechanism controlling the operation of said shifting mechanism at least partially automatically depending upon said variable control effect, and a retarding device operatively connected to said automatic regulating mechanism for preventing immediate operation of said shifting mechanism upon shifting to a higher speed including a movable retarding element operated by an auxiliary force controlled by said automatic regulating mechanism, said retarding element releasing operation of said shifting mechanism after predetermined movement thereof.

11. In a driving mechanism the combination according to claim 10, wherein the auxiliary force is an elastic force and the retarding element includes a piston which is adjustably housed in a hydraulic damping fluid.

12. In a driving mechanism the combination according to claim 10, wherein the retarding element is provided with an adjusting mechanism by which the period of the retardation of the shifting can be regulated.

13. In a driving mechanism for vehicles a driving engine, a performance regulating mechanism for said engine, a transmission, a shifting mechanism for shifting said transmission, an automatic speed-responsive regulating mechanism controlling the operation of said shifting mechanism depending upon the driving speed, means for directly controlling said automatic regulating mechanism by said performance regulating mechanism to prevent operation of said shifting mechanism by said regulating mechanism upon adjustment of said performance regulating mechanism to a higher performance until a higher driving speed has been reached, and a retarding device operatively connected to said automatic regulating mechanism for preventing said automatic regulating mechanism from operating said shifting mechanism for a given period of time at least upon shifting to a higher speed.

14. In a driving mechanism the combination according to claim 13, further comprising means controlling said shifting mechanism to provide the shifting up at a higher driving speed than the shifting down.

15. In a driving mechanism the combination according to claim 13, wherein the performance regulation mechanism can be adjusted above the full load position, in combination with a device which is connected with the performance regulation mechanism in such a way that, when the latter is adjusted above the full load position, a lower speed is engaged.

16. In a drive mechanism the combination according to claim 13 wherein means are provided for interrupting the dependence of said regulating mechanism on said performance regulation mechanism when said transmission is shifted downwardly.

17. A shifting installation for the transmission in a vehicle drive, comprising a gear shifting member, a governor controlling the operation of said gear shifting member dependent upon the driving speed, a retarding device with a retarding member operative to retard the controlling effect of said governor on said gear shifting member, and means for controlling said retarding member by said governor and for initiating the retarded movement of said retarding member when the speed of the vehicle has reached a predetermined value to prevent immediate operation of said gear shifting member at that time at least when shifting to a higher speed and for operating said gear shifting member upon completion of the retarded movement of said retarding member.

18. A shifting installation according to claim 17, wherein said means includes an operating mechanism between said governor and said shifting mechanism, and switch means dependent upon the driving speed for controlling said operating mechanism regulated by said governor at a speed below a predetermined driving speed to by-pass said retarding device and for directly operating said shifting mechanism to engage a lower speed.

19. A shifting installation according to claim 17 wherein said means comprises an electrical circuit including a relay operative to release the retarding device upon closing of the circuit by the governor to cause current to flow through the relay and to actuate the shifting mechanism through the retarding device upon switching of the circuit to by-pass the relay at the end of said retarded movement.

20. A shifting installation according to claim 17 wherein the retarding device comprises a cylinder and a cooperating spring-urged piston member, a bore in the piston, a check-valve for closing the bore upon movement of the piston member under spring pressure, an adjustable by-pass between both sides of the piston member, a device controlled by the governor for moving the piston in opposition to spring pressure, and a locating device controlled by the governor for holding the piston in an end position after movement in opposition to spring pressure.

21. In a drive mechanism, a change-speed gear including a shifting mechanism, a governor controlling the operation of said shifting mechanism automatically in dependence on the driving speed, and means including a retarding device for controlling the operation of said shifting mechanism by said governor to provide a delayed operation of said shifting mechanism upon shifting to a higher speed while effectively disabling said retarding device upon shifting to a lower speed.

22. In a drive mechanism, the combination according to claim 21 with a first control circuit connecting the governor directly to the shifting mechanism and a second control circuit connecting the governor to the shifting mechanism through the retarding device.

23. In a drive mechanism, the combination according to claim 21 with two electrical circuits alternatively connecting the governor to the shifting mechanism and comprising respectively a relay in the first circuit operative to operate the shifting mechanism immediately in one shifting direction and a relay in the second circuit operative to operate the shifting mechanism through the retarding device in the other shifting direction.

24. In a drive mechanism, a change-speed gear, a shifting mechanism for shifting the gear, a governor for controlling the operation of the shifting mechanism at least partly automatically in dependence on the drive speed, means including a retarding device for controlling the operation of said shifting mechanism by said governor comprising, a first electrical circuit and a second electrical circuit alternatively controlled by the governor for transmitting the operating movements of the governor to the shifting mechanism, the first circuit comprising a relay for immediately actuating the shifting mechanism in one direction of gear change, the second circuit comprising a first line, and a second line and a switch therebetween, the first line including the relay of the first circuit and the second line including a relay for actuating the shifting mechanism in the other direction of gear change, the switch being operatively connected to the retarding device for actuation thereby to close the first line at the beginning of the retarding action and the second line at the end thereof.

25. In a drive mechanism, the combination according to claim 24 with a hydraulic retarding device, a relay in the first circuit operative to preload the retarding device in opposition to spring pressure upon closing of the first circuit, and a further relay in the second circuit for releasing the retarding device upon switching from the first circuit to the second circuit.

26. In a drive mechanism, the combination according to claim 24 wherein the first and second circuits are so arranged relatively to the governor that the first circuit is closed for downward gear change and the second for upward gear change.

References Cited in the file of this patent

UNITED STATES PATENTS

| | | |
|---|---|---|
| 1,910,180 | Poncelet | May 23, 1933 |
| 2,008,231 | Vincent | July 16, 1935 |
| 2,071,785 | Ehrlich | Feb. 23, 1937 |
| 2,092,446 | Fleischel | Sept. 7, 1937 |
| 2,120,104 | Livermore | June 7, 1938 |
| 2,304,862 | Thomas | Dec. 15, 1942 |
| 2,349,297 | Neracher | May 23, 1944 |
| 2,352,212 | Lang | June 27, 1944 |
| 2,446,087 | Hobbs | July 27, 1948 |
| 2,509,981 | McKechnie et al. | May 30, 1950 |
| 2,620,680 | Forman | Dec. 9, 1952 |

FOREIGN PATENTS

| | | |
|---|---|---|
| 614,428 | Great Britain | Dec. 15, 1948 |
| 722,532 | Germany | July 11, 1942 |